United States Patent

[11] 3,591,270

[72] Inventor Takehiko Takahashi
 Tokyo, Japan
[21] Appl. No. 824,969
[22] Filed May 15, 1969
[45] Patented July 6, 1971
[73] Assignee Sankyo Kogaku Kogyo Kabushiki Kaisha
 Nagano-ken, Japan

[54] MOVIE CAMERA
 4 Claims, 14 Drawing Figs.
[52] U.S. Cl. .................................................. 352/72
[51] Int. Cl. ...................................................... G03b 17/26,
 G03b 17/04
[50] Field of Search........................................... 352/72,
 116, 174, 179, 176; 95/31; 242/197, 198, 55.19,
 71.1

[56] References Cited
 UNITED STATES PATENTS
Re. 21435 4/1940 Scheibell..................... 352/72
3,209,368 9/1965 Misawa........................ 352/174
3,243,251 3/1966 Wessner....................... 352/72

Primary Examiner—Louis R. Prince
Assistant Examiner—Denis E. Corr
Attorney—McGlew and Toren ABSTRACT: A movie camera having a vertically elongated camera body formed in its rear wall with an opening for inserting a film cassette, so that no film housing or film cassette housing is formed in the camera body. The movie camera also has a finder supporter pivotally mounted on one side of the camera body and supporting a coupling mechanism for operatively connecting a film takeup shaft of the film cassette inserted in the opening in the camera body to shutter means and film-advance means built in the camera body, whereby the film takeup shaft can be operated.

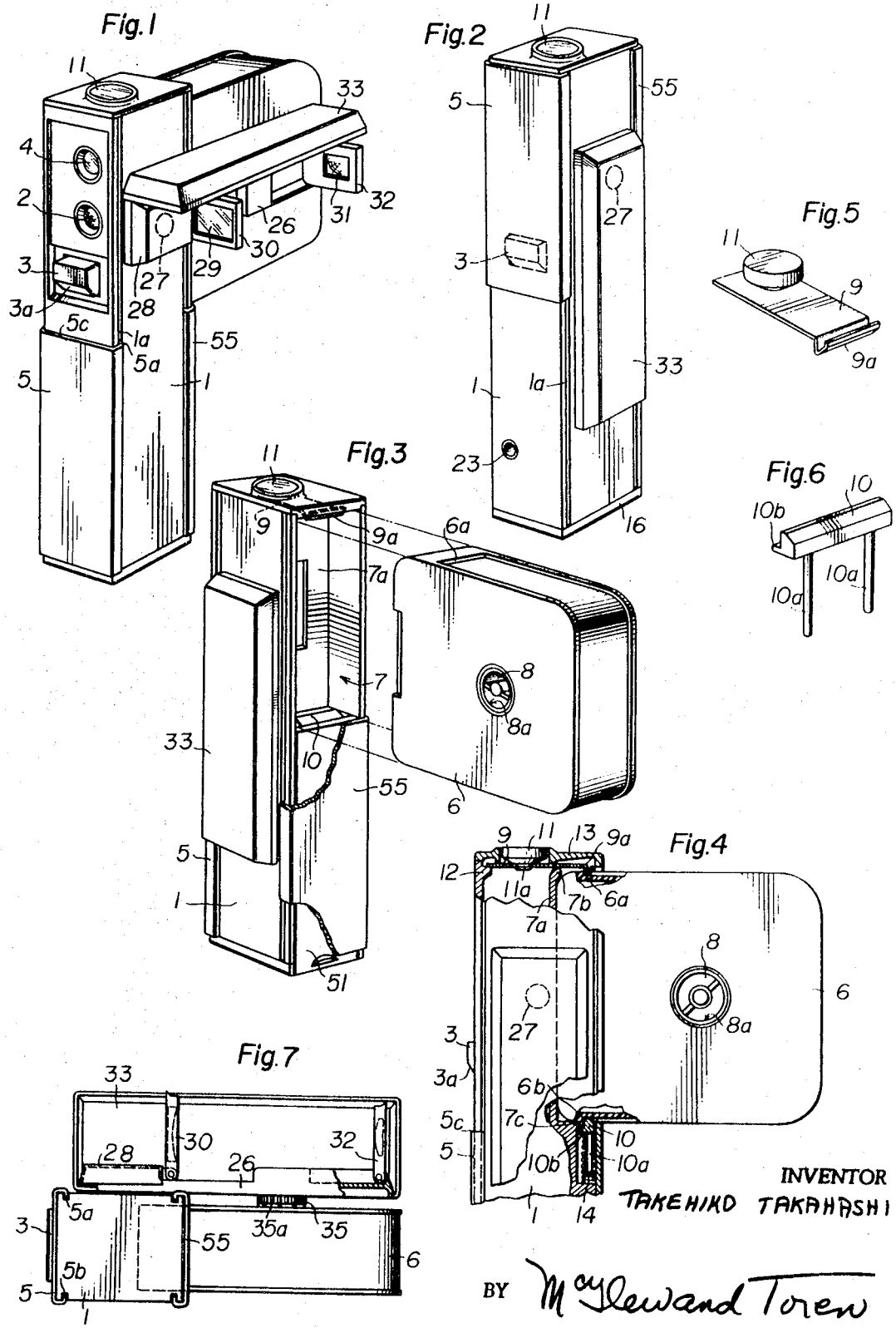

PATENTED JUL 6 1971

INVENTOR
TAKEHIKO TAKAHASHI

BY McGlew and Toren
ATTORNEYS 3,591,270

MOVIE CAMERA

The present invention relates to movie cameras in general. In particular, the invention deals with a movie camera of the small type which uses a film cassette.

In general, movie cameras are formed with a film housing which is integral with a camera body. Of all the elements making up a camera, the film housing occupies the greatest space. Attempts to obtain an overall compact size and a light weight in a movie camera have hitherto been hampered by this fact. Also, movie cameras are generally of a flat box type because they must have a film housing formed therein. Movie camera bodies this shape are generally made by die casting in which costly dies are used. Camera bodies made by this method are expensive.

Accordingly, an object of the present invention is to provide a movie camera which represents a departure from stereotyped movie cameras of the prior art and which is advantageous and convenient in manufacture, use and carrying about.

Another object of the invention is to provide a movie camera which has means for positively loading a camera body with a film cassette, the camera body having no film housing or film cassette housing formed therein.

Another object of the invention is to provide a movie camera in which a shutter button keep plate is slidably fitted over a front surface of the vertically elongated camera body for free upward and downward motion to facilitate the use of the camera.

Still another object of the invention is to provide a movie camera which permits to readily take pictures by remote control by using the shutter button keep plate.

According to one aspect of the invention, there is provided a movie camera which comprises a camera body formed in its rear wall with an opening for receiving a forward end portion of a film cassette therein, cassette-retaining means for holding in place the film cassette inserted in said opening, a finder supporter mounted for pivotal motion at one end thereof on a shaft connected to one side of said camera body, connecting and disconnecting means rotatably mounted in the finder supporter and adapted to be operatively connected to a film takeup shaft of the film cassette when said finder supporter is brought to an operative position, and coupling means for rotating the connecting and disconnecting means upon release of the shutter so as to thereby cause the film takeup shaft to rotate in a predetermined direction.

According to another aspect of the invention, there is provided a movie camera comprising a vertically elongated camera body having in its upper forward portion a taking lens and a shutter release button and in its lower portion a cell serving as a power supply for an electric motor for operating shutter means and film-advance means, and a shutter release button keep plate slidably fitted over the front surface of the camera body for upward and downward motion, the taking lens and said shutter release button being exposed to view when the shutter release button keep plate is moved downwardly to a position corresponding to a lower portion of the camera body and the taking lens and the shutter release button being covered with said shutter release button keep plate when the shutter release button keep plate is moved upwardly to a position corresponding to an upper portion of the camera body.

The characterizing features of the movie camera according to this invention lie in the facts that, since a film cassette can be mounted directly through a rear wall of the camera body, the film housing or the film cassette housing, which is generally formed in the camera body in conventional movie cameras has been eliminated, and that shutter means and the film advance means built in the camera body can be operatively connected to the film takeup shaft of the film cassette through the agency of the coupling mechanism provided in the finder supporter.

The present invention offers many advantages. The camera body has a very simple construction, so that it can be made by a drawing process. The movie camera embodying this invention is very light in weight. The invention also permits to obtain a very compact overall size in a movie camera because of the fact that the camera body has no film housing formed therein. Coupled with light weight, compact size makes this movie camera easy and convenient to carry about.

Additional objects as well as features and advantages of this invention will become apparent from the description set forth hereinafter when considered in conjunction with accompanying drawings, in which:

FIG. 1 is a perspective view of a movie camera embodying the present invention;

FIG. 2 is a perspective view of the movie camera of FIG. 1 in an inoperative position;

FIG. 3 is a perspective view showing the manner in which a film cassette is mounted on the movie camera of FIG. 2;

FIG. 4 is a fragmentary side view of the movie camera of this invention loaded with a film cassette, with certain parts being out, showing cassette-mounting means of the movie camera;

FIG. 5 is a perspective view of a cassette-holding member of the cassette-mounting means;

FIG. 6 is a perspective view of a cassette-arresting member for receiving the cassette in the cassette-mounting means;

FIG. 7 is a plan view of the movie camera of FIG. 1 as seen from the bottom;

Figure 8:
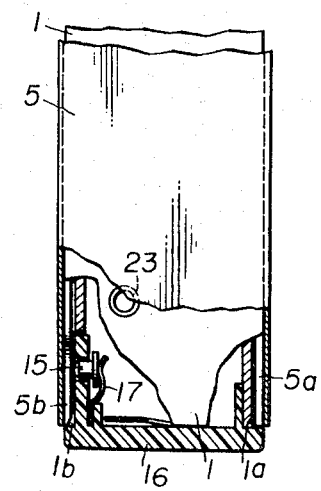
FIGS. 8 and 9 are fragmentary front views of the movie camera embodying this invention showing the section switch means for a power source.

An embodiment of the invention will now be explained with reference to the drawings. FIG. 1 shows a movie camera embodying this invention which is loaded with a film cassette to be ready for operation. The movie camera includes a vertically elongated camera body 1 having a taking lens 2 mounted in its upper front portion. The camera body 1 is formed with a light-admitting window 4 for automatic exposure-setting means and a shutter release button 3 on its front wall. A slidable shutter release button keep plate 5 is slidably fitted over a front surface of the camera body 1 and serves concurrently as a cover for the taking lens 2. The camera body 1 is formed on its rear wall with an opening 7 for receiving a forward end portion of a film cassette 6 therein as shown in FIG. 3. A sliding cover 51 for a cell housing in a lower portion of the camera body is provided below the opening 7. A plate 55 is slidably fitted over the sliding cover 51 in the rear of the camera body in the same manner as the shutter release button keep plate 5 is fitted over the front surface of the camera body 1. Plate 55 can be moved upwardly in sliding motion to close the opening 7 and prevent the intrusion of dust or the like into the opening 7 when the film cassette 6 is withdrawn from the opening 7. The film cassette 6 is of the type which is commercially available and in which a film feed shaft and a film takeup shaft 8 are mounted coaxially.

Upon insertion of the forward end portion of the film cassette 6 in the opening 7, a cassette-holding member 9 and a cassette-arresting member 10 yieldably mounted on the upper end and the lower end of the opening 7 respectively are brought into engagement with an offset portion 6a and an offset portion 6b of the film cassette 6, respectively, (See FIG. 4) whereby the film cassette 6 is held in position in the opening 7. The film cassette 6 is protected against intrusion of light by causing the front face of the cassette 6 to bear against a partition plate 7a of the opening 7 when the cassette 6 is held in place in the opening 7. Suitable light-shielding means, may be provided on the edge of the opening 7 to positively prevent intrusion of light.

The cassette-holding member 9 is firmly attached to a pushbutton 11 exposed on a top wall 13 of the camera body 1. As shown in FIG. 4, the cassette-holding member 9 is supported in a position forwardly of a mounting portion 11a of the pushbutton 11 by an inward projection 12 formed on the inner side of the front wall of the camera body 1 and, at a position rearwardly of the mounting portion 11a of pushbutton 11, by an upper end edge 7b of the partition plate 7a so that the cassette-holding member 9 is positioned inwardly of the top wall 13 of the camera body 1. The pushbutton 11 is useful in withdrawing the film cassette 6 from the opening 7. Upon depressing the pushbutton 11 by a finger, a portion of the cassette-holding member 9 disposed between the projection 12 and the edge 7b is curved downwardly and a portion of the cassette-holding member 9 disposed rearwardly of the edge 7b is bent upwardly, so that an engaging portion 9a is formed on the rearward end of the cassette-holding member 9 is released from engagement with the offset portion 6a of the film cassette 6, thereby permitting to readily remove the film cassette 6 from the opening 7.

The arresting member 10 adapted to engage the lower portion of the film cassette 6 is urged upwardly by springs 14, 14 loosely wound on legs 10a, 10a of the member 10, the upward movement of the member 10 being restricted by impinging of ledge 10b. As cassette 6 is being inserted in the opening 7, the arresting member 10 moves downwardly against the biasing force of the springs 14, 14 to thereby facilitate insertion of the film cassette 6 in the opening 7. The arresting member 10 need not be made movable upwardly and downwardly. Alternatively, a fixed arresting member may be provided in the opening 7.

Figure 9:
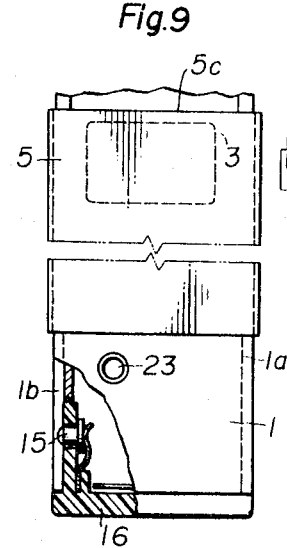
Figure 10:
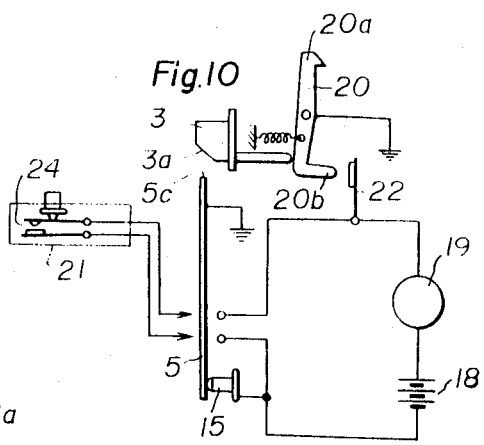
FIG. 10 is a schematic wiring diagram showing one example of the electrical circuit used with the movie camera according to this invention.

The shutter release button keep plate 5 is formed on opposite sides thereof with inwardly bent edges 5a and 5b (See FIG. 8) which are loosely received in guide grooves 1a and 1b of the camera body 1, whereby the shutter release button keep plate 5 can be moved upwardly and downwardly in sliding motion, When the shutter release button keep plate 5 is moved upwardly, inwardly bent edge 5b is electrically disconnected from a contact 15 (See FIGS. 8 to 10) and at the same time an upper edge 5c of the keep plate 5 impinges on a bevelled surface 3a of the shutter release button 3 to press the shutter release button inwardly. The contact 15 which is mounted on an insulating lower end plate 16 is connected to a cell 18 serving as a power source (See FIG. 10) through a contact member 17 bearing against the contact 15. The keep plate 5 connected to the camera body 1 serves to ground the camera body. In FIG. 10, the numeral 19 is an electric motor for operating a shutter means and film advance means, 20 is a shutter release member, and 21 is remote control means.

Upon depression of the shutter release button 3 by a finger, one end 20a of shutter release member 20 is released from engagement with a shutter plate, and at the same time the other end 20b of said release member 20 is brought into engagement with a terminal 22 of the electric motor 19 to close the power supply circuit of the motor 19 whereby the motor 19 is started. However, when the shutter release button 3 is depressed by the keep plate 5 moved upwardly, the electric motor 19 is prevented from starting because the keep plate 5 is electrically disconnected from the contact 15. The movie camera shown in FIG. 2 is in an inoperative position in which the keep plate 5 is moved to its upper position to thereby depress the shutter release button 3 and provide cover for the taking lens 2 so that the taking lens can be protected against accidental damage when the camera is not used and the shutter release button can be prevented from being inadvertently operated. FIG. 9 shows the keep plate 5 in the intermediate position so that the upper portion of the keep plate 5 depresses the shutter release button 3 but does not provide cover for the taking lens.

If the keep plate 5 is moved upwardly to a position in which the upper portion thereof depresses the shutter release button then a socket 23 for remote control operation is exposed to view on the front surface of the camera body 1 as shown in FIG. 9. The power source circuit of the electric motor 19 is formed when remote control means consisting principally of a switch 24 (See FIG. 10) is inserted in the socket 23 and switch 24 is closed. Therefore, the electric motor 19 operates the released shutter and film-advance means upon depression of the shutter button 3 by the keep plate 5. It will be appreciated from the foregoing description that the keep plate 5 performs the functions of protecting the taking lens against accidental damage, preventing an inadvertent operation of the shutter button, and controlling a remote control operation.

A finder supporter 26 is pivotally mounted at one end thereof on a shaft 27 mounted on one side of the upper portion of the camera body 1. The finder supporter mounting portion including the shaft 27 is covered with a boxlike member 28 (See FIG. 1) firmly secured to the finder supporter 26. A supporting frame 30 mounting an objective lens 29 therein and a supporting frame 32 mounting an eyepiece 31 therein are mounted on one side of the finder supporter 26 by hinge connection. The two supporting frames 30 and 32 can be moved to a lying position in which they are flush with a lateral surface of the finder supporter 26 by pivotally moving the same toward each other.

In FIG. 1, the finder consisting of the objective lens 29 and the eyepiece 31 has an eaves 33 which is hinged on one edge thereof to one edge of the finder supporter 26, whereby the eaves 33 can be moved downwardly in pivotal motion to provide cover to the finder supporter 26 after the lens supporting frames 30 and 32 are brought to a lying position. FIG. 2 shows the finder supporter 26 housing the finder therein after the eaves 33 is moved downwardly in pivotal motion to a position over the finder supporter 26 which is then pivotally moved from a horizontal position shown in FIG. 1 to a vertical position by pivotally moving the same through 90°.

Figure 11:
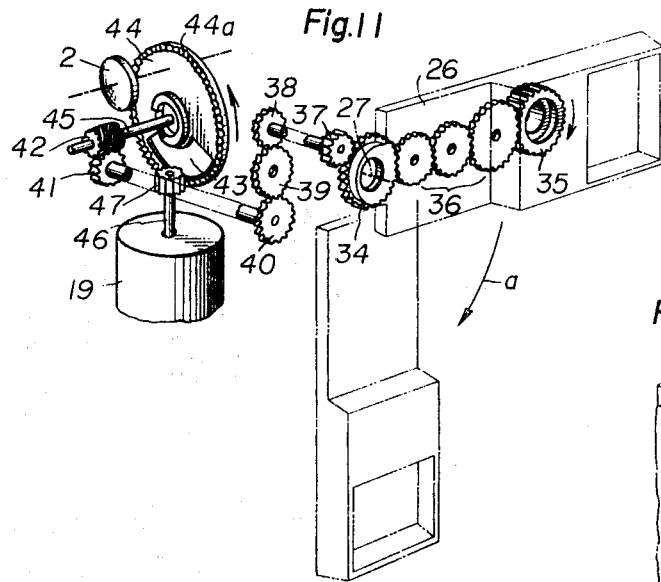
FIG. 11 is a perspective view of a gear train for operating a film takeup shaft of the film cassette.
Figure 13:
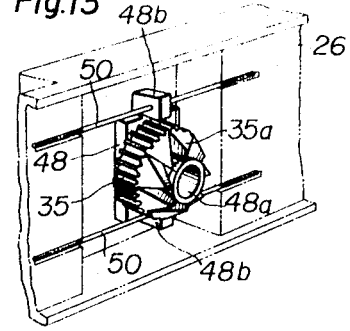
FIG. 13 is a perspective view of an engaging and disengaging member adapted to be brought into operative engagement with the film takeup shaft of the film cassette.
Figure 12:
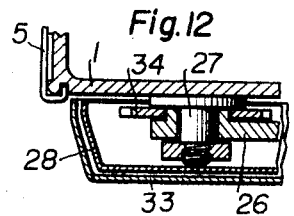
FIG. 12 is a view in section showing the mounting portion of a finder supporter.

Mounted on the inner side of the finder supporting frame 26 as shown in FIG. 11 are a gear 34 rotatably mounted on the shaft 27, an engaging and disengaging gear 35 having engaging projections 35a of the sawtooth shape on one end surface (See FIG. 13), and a gear train 36 connecting gears 34 and 35 together. The gear 34 is connected through gears 37, 38, 39, 40 and a worm gear 41 mounted on the camera body 1 to a worm 42 which is firmly fixed to a shaft 45 of a shutter plate 44 having a segmental opening 43. The shutter plate 44 rotates in the direction of arrow as face teeth 44a are engaged by a rotating pinion 47 mounted on a motor shaft 66 to thereby open and close an exposure window (not shown).

Figure 14:
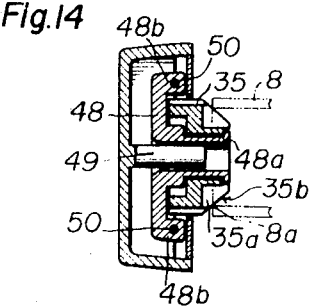
FIG. 14 is a view in section showing the engaging and disengaging member and the finder supporter supporting the engaging and disengaging member.

The engaging and disengaging gear 35 is loosely fitted over a tubular shaft 48a of a movable member 48 as shown in FIG. 14, tubular shaft 48a being loosely fitted over a shaft 49 firmly fixed to the finder supporter 26. A resilient wire 50 extends through each of a pair of projections 48b formed on opposite ends of the movable member 48. The wires 50 are supported at opposite ends thereof by the finder-supporting frame 16 whereby the engaging and disengaging gear 35 is positioned such that the engaging projections 35a extend through an opening formed in an inner sidewall of the finder supporting frame 26. The engaging projections 35a are disposed in a position in which they can engage the film takeup shaft 8 of the film cassette 6 when the finder supporting frame 26 is brought to an operative position or a horizontal position as shown in FIG. 1. FIG. 7 shows the engaging projections 35a in engagement with the film takeup shaft 8.

If the shutter release button 3 is depressed while the engaging projections 35a are in engagement with the film takeup shaft 8, then the engaging and disengaging gear 35 coupled to the shutter rotates in the direction of arrow in FIG. 11 to thereby operate the film takeup shaft 8 of the film cassette 6.

If the finder supporting frame 26 is moved in pivotal motion in the direction of arrow *a* in FIG. 11 while the engaging projections 35*a* remain in engagement with the film takeup shaft 8, then partially conical surfaces 35*b* (See FIG. 14) of the engaging projections 35*a* are pushed by an edge 8*a* of the film takeup shaft 8, whereby the engaging and disengaging gear 35 is urged inwardly into the finder supporting frame 26 against the resilient force of the wires 50. The engaging projections 35*a* are thus released from engagement with the film takeup shaft 8 of the film cassette 6. No additional operation is required to release the engaging projections 35*a* from engagement with the film takeup shaft 8.

The gear train mounted in the finder supporter for operatively connecting the rotating parts mounted on the camera body to the film takeup shaft of the film cassette may be replaced by an endless belt consisting of spring coils. It is to be understood that means for connecting and disconnecting the engaging projections of the engaging and disengaging gear and the film takeup shaft is not limited to the specific form of the embodiment shown in the drawings and described in the specification, and that other connecting and disconnecting means of various forms suited for film cassettes used with movie films may also be used.

What I claim is:

1. A movie camera comprising a camera body formed in its rear wall with an opening for receiving the forward end portion of a film cassette therein, cassette retaining means for holding in place said film cassette inserted in said opening, a finder supporter mounted for pivotal motion at one end thereof on a shaft connected to one side of said camera body, engaging and disengaging means rotatably mounted in said finder supporter and adapted to be operatively connected to a film takeup shaft of said film cassette when said finder supporter is brought to an operative position, and coupling means for rotating said engaging and disengaging means upon release of a shutter to thereby cause the film takeup shaft to rotate in a predetermined direction.

2. A movie camera comprising a camera body formed in its rear wall with an opening for receiving the forward end portion of a film cassette therein, a cassette-holding member positioned on an inner surface of an upper end of said opening and adapted to engage an offset portion formed on an upper surface of a forward end portion of said film cassette, an arresting member projecting upwardly from an inner surface of a lower end of said opening and adapted to engage an offset portion formed on an underside of a forward end portion of said film cassette, a pushbutton provided on a top wall of the camera body for releasing said holding member from engagement with the offset portion of the film cassette, a finder supporter mounted for pivotal motion at one end thereof on a shaft connected to one side of the camera body, engaging and disengaging means rotatably mounted in said finder supporter and adapted to be operatively connected to a film takeup shaft of said film cassette when said finder supporter is brought to an operative position, and coupling means for rotating said connecting and disconnecting means upon release of the shutter to thereby cause the film takeup shaft to rotate in a predetermined direction.

3. A movie camera comprising a vertically elongated camera body, an electric motor in said body for operating shutter means and film advance means, said body having, in its upper forward portion, a taking lens and a shutter release button and, in its lower portion, a cell serving as a power source for said motor, and a shutter button keep plate slidably fitted over the front surface of said camera body for vertical reciprocation thereover, said taking lens and said shutter release button being exposed to view when said shutter button keep plate is moved downwardly to a position corresponding to the lower portion of the camera body, and said taking lens and said shutter release button being covered by said shutter button keep plate when said shutter button keep plate is moved upwardly to a position corresponding to the upper portion of the camera body, said shutter button keep plate, when moved to its upper position, depressing said shutter release button.

4. A movie camera, as claimed in claim 3, further including shutter release means engageable with a shutter plate, means operable by said shutter release button, when said button is depressed by said shutter button keep plate as said shutter button keep plate is moved to its upper position, to release said shutter release means from engagement with the shutter plate, a power supply circuit electrically interconnecting said cell and said motor and including a contact opened and closed by said shutter button keep plate, said contact opening said power supply circuit when said shutter button keep plate is moved to its upper position, a socket exposed to view when the shutter button keep plate is moved to its upper position, and having two terminals therein forming part of said power supply circuit, said socket being arranged to have inserted therein remote control means for releasing the shutter, and a normally open switch included in said remote control means and arranged, when closed, to interconnect said two terminals.